No. 705,353. Patented July 22, 1902.
O. W. HUNSAKER.
CASH REGISTER.
(Application filed Oct. 22, 1900.)
(No Model.) 5 Sheets—Sheet 1.

Fig.1.

Witnesses
W. A. Alexander
Jesse R. Watkins

Inventor
O. W. Hunsaker
By Attorneys
Fowler & Bryson

No. 705,353. Patented July 22, 1902.
O. W. HUNSAKER.
CASH REGISTER.
(Application filed Oct. 22, 1900.)
(No Model.) 5 Sheets—Sheet 2.

Witnesses
W. A. Alexander
Jessie R. Watkins

Inventor
O. W. Hunsaker
By Attorneys

No. 705,353. Patented July 22, 1902.
O. W. HUNSAKER.
CASH REGISTER.
(Application filed Oct. 22, 1900.)
(No Model.) 5 Sheets—Sheet 3.

Witnesses
W. A. Alexander
Jesse R. Watkins

Inventor
O. W. Hunsaker
By Attorneys
Fowler & Bryson

THE NORRIS PETERS CO., PHOTO-LITHO., WASHINGTON, D. C.

No. 705,353. Patented July 22, 1902.
O. W. HUNSAKER.
CASH REGISTER.
(Application filed Oct. 22, 1900.)

(No Model.) 5 Sheets—Sheet 4.

Witnesses
W. H. Alexander
Jessie R. Watkins.

Inventor
O. W. Hunsaker
By Attorneys
Fowler & Bryson

No. 705,353. Patented July 22, 1902.
O. W. HUNSAKER.
CASH REGISTER.
(Application filed Oct. 22, 1900.)
(No Model.) 5 Sheets—Sheet 5.

Witnesses
W. H. Alexander
Jessie R. Watkins

Inventor
O. W. Hunsaker
By Attorneys
Fowler & Bryson

UNITED STATES PATENT OFFICE.

OSCAR W. HUNSAKER, OF ST. LOUIS, MISSOURI.

CASH-REGISTER.

SPECIFICATION forming part of Letters Patent No. 705,353, dated July 22, 1902.

Application filed October 22, 1900. Serial No. 33,864. (No model.)

*To all whom it may concern:*

Be it known that I, OSCAR W. HUNSAKER, a citizen of the United States, residing at the city of St. Louis, in the State of Missouri, have invented a certain new and useful Cash-Register, of which the following is such a full, clear, and exact description as will enable any one skilled in the art to which it appertains to make and use the same, reference being had to the accompanying drawings, forming part of this specification.

My invention has reference more particularly to the class of cash-registers described in Patent No. 638,929, granted to me December 12, 1899, in which a plurality of indicators are actuated by a lever pivoted to move in one direction to determine the indicator to be actuated and in another direction to operate and display the indicator.

One object of my invention is to provide a register of the class described with an adding mechanism which will add the various amounts displayed by the indicators.

Another object of my invention is to so construct a register that a single pivoted lever can be used to actuate all the indicators in the machine.

Another object of my invention is to improve the mechanism for controlling the opening of the cash-drawer.

My invention consists in part in the combination, with a plurality of indicators, of a lever pivoted to swing in one direction to determine the indicator to be displayed and in another direction to actuate and display said indicator and adding mechanism actuated by said lever to add the amounts displayed by said indicators.

My invention also consists in part in the combination, with a plurality of indicators arranged in sets, of a pivoted lever adapted to actuate and display the individual indicators of said sets and a printing mechanism carried by said lever and provided with printing characters arranged in sets to correspond with the sets of indicators.

My invention also consists in part in the combination, with a plurality of indicators, of a pivoted lever moving in one direction to determine the indicator to be displayed and in another direction to actuate and display said indicator, a cash-drawer, a pivoted member locking said drawer, means for normally preventing the movement of said pivoted member, and connections actuated by said lever for releasing said pivoted member.

My invention also consists in various other novel features and details of construction, all of which are described in the following specification, and pointed out in the claims affixed hereto.

In the accompanying drawings, which illustrate one form of cash-register made in accordance with my invention.

Like marks of reference refer to similar parts in the several views of the drawings.

15 is the casing of the machine, which preferably rests on a base 16. The casing 15 is provided with glazed openings 17, through which the amounts displayed by the indicators may be viewed.

18 represents two side strips, preferably of metal, which form the lower part of the framing of the machine. Near the rear end of the side strips 18 are two uprights 19, connected at the top by a strip 20, preferably formed integral therewith. The said strips 18 are also connected by means of a cross-plate 21, rigidly secured thereto. Secured to the plate 21 are two short uprights 22, to which is secured a segment 23, carrying pins 24, between which the main or operating lever of the register works. Secured to the uprights 22 are the ends of two bars 25, the opposite ends of which are secured to the uprights 19. The bars 25 carry a cross-plate 26, upon which the adding mechanism is mounted.

28 is the main or operating lever of the machine, and it is pivotally mounted in the bifurcated end of a stud 29. The stud 29 is pivoted on a pin 31, (shown in dotted lines in Fig. 2,) mounted in the cross-plate 21. The forward end of the lever 28 is provided with a handle 32 and is adapted to move vertically in the spaces between the pins 24. The handle 32 is provided with a pointer 33, which moves in proximity to a plate 34, carrying figures thereon corresponding to the figures of the indicators, so as to readily determine the proper position of the lever 28 to display any desired indicator. The plate 34 is carried by a segment 35, which is in turn secured to the segment 23. The rear end of the lever 28 is adapted to coöperate with the lower ends of rods 37, carried in the cross-plate 20, and a plate 38, secured between the uprights 19. The rods 37 are provided on their upper ends with tabs 39, provided with numerals and serving as indicators to display the various amounts through the glazed openings 17. The rods 37 are held in their normal position by means of pins 40, Fig. 2, which rest on the cross-bar 38. In order to hold the rods 37 in their raised position, each of said rods is provided with a spring-detent 41, adapted to engage with a U-shaped member 42, pivoted between the uprights 19. In order to release the rods 37, the pivoted member 42 is provided with an L-shaped part 43, adapted to engage with a pawl 44, pivoted to an arm 45. The pawl 44 and arm 45 are connected by means of a spring 46, which holds the pawl 44 in its normal position against the L-shaped part 43. The arm 45 is rigidly secured to a U-shaped frame 47, pivoted between the uprights 22. The central part of the U-shaped frame 47 is provided with a curved portion 48, adapted to rest upon the operating-lever 28, and thus move the frame 47 on its pivot when the main lever is operated to display a number.

Figure 7:
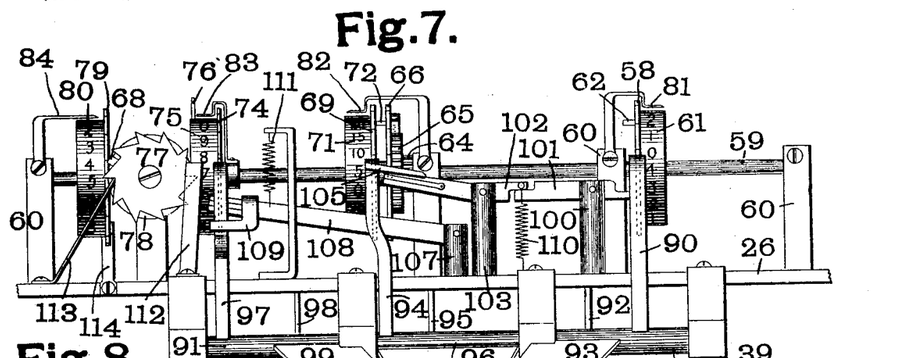
Fig. 7 is an enlarged front view of the adding mechanism.
Figure 8:
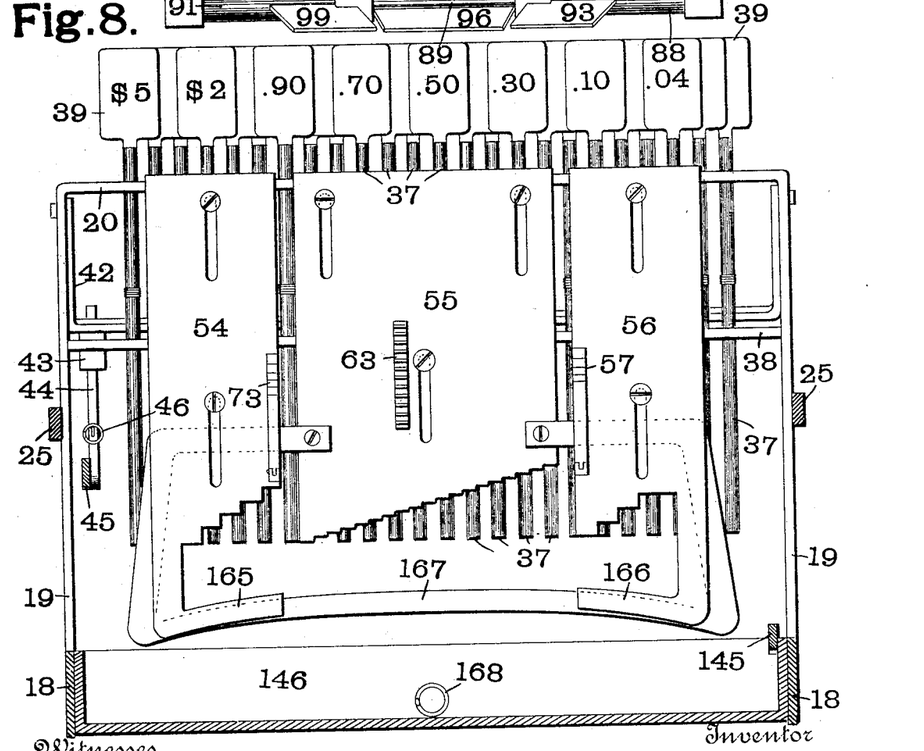
Fig. 8 is a section on the line 8 8 of Fig. 6.

Secured to the cross-bar 20 are three members 51, 52, and 53, to which are secured sliding plates 54, 55, and 56, respectively. These sliding plates 54, 55, and 56 transfer the movement of the main lever 28 to the adding mechanism now to be described. The plates 54, 55, and 56 are notched on their lower edges, as best shown in Fig. 8, the plate 54 being shown with five notches, the plate 55 with nineteen notches, and the plate 56 with four notches. The plate 56 has pivoted to it a pawl 57, provided with four teeth corresponding to the four notches on the lower end of said plate. The pawl 57 engages with a ratchet-wheel 58. This ratchet-wheel 58 is loosely mounted on a rod or shaft 59, carried in uprights 60, which are secured to the cross-plate 26. The ratchet-wheel 58 has secured to it a short drum 61, adapted to have placed on its periphery one or more sets of numerals from "0" to "4." Owing to the small number of numerals in this set it is preferably repeated a number of times on the wheel. Opposite each fifth tooth of the wheel 58 is a pin 62, which is adapted to actuate a carrying device hereinafter to be described. Upon the sliding plate 55 is a rack 63, which engages with a pinion-wheel 64, loosely mounted on the shaft 59. The pinion-wheel 64 is rigidly secured to a ratchet-wheel 65. Adjacent to the ratchet-wheel 65 is a large ratchet-wheel 66, similar to the ratchet-wheel 58. The ratchet-wheel 66 is provided with a pawl 67, engaging with the ratchet-wheel 65. The ratchet-wheel 66 is rigidly secured to a ratchet-wheel 69, which is similar in all respects to the said ratchet-wheel 66, except that its teeth are inclined in the opposite direction. The wheel 69 is provided with a short drum 71, the periphery of which is to contain numerals running from "0 0" to "95" by fives. The ratchet-wheels 66 and 69 are connected by means of a pin 72, Fig. 7, adapted to actuate carrying mechanism to be hereinafter described. The sliding plate 54 is provided with a pawl 73, similar to the pawl 57 in the plate 56, but provided with five teeth corresponding to the five notches in the lower edge of the plate 54. The pawl 73 engages with a ratchet-wheel 74, loosely mounted on the shaft 56. The ratchet-wheel 74 has secured to it a short drum 75, adapted to contain on its periphery a number of sets of numerals from "0" to "9." Opposite each tenth tooth on the drum 75 is a pin 76, which is adapted to engage and operate a ratchet-wheel 77, which is rigidly connected with a drum 78, containing on its periphery numerals from "0" to "9." Carried by the ratchet-wheel 77 is a pin 68, which is adapted to engage with and operate a ratchet-wheel 79, loosely mounted on the shaft 59. The ratchet-wheel 79 is rigidly secured to a short drum 80, which contains a suitable number of numerals, preferably from "0" to "19." It will readily be understood that when the sliding plates 54, 55, and 56 are raised by the lever 28 the corresponding ratchet-wheels 58, 64, or 74 will be actuated, the amount of movement imparted to the wheels varying with the amount of movement of the said plates. This will cause the drums 61, 71, and 75 to be rotated to display the corresponding numbers. The drums are preferably provided with pointers 81, 82, and 83, respectively, as shown in Fig. 7, so as to indicate the numeral on the drum which corresponds to the indicator displayed. The drum 80 is also preferably provided with a similar indicator 84.

Figures 2, 3:
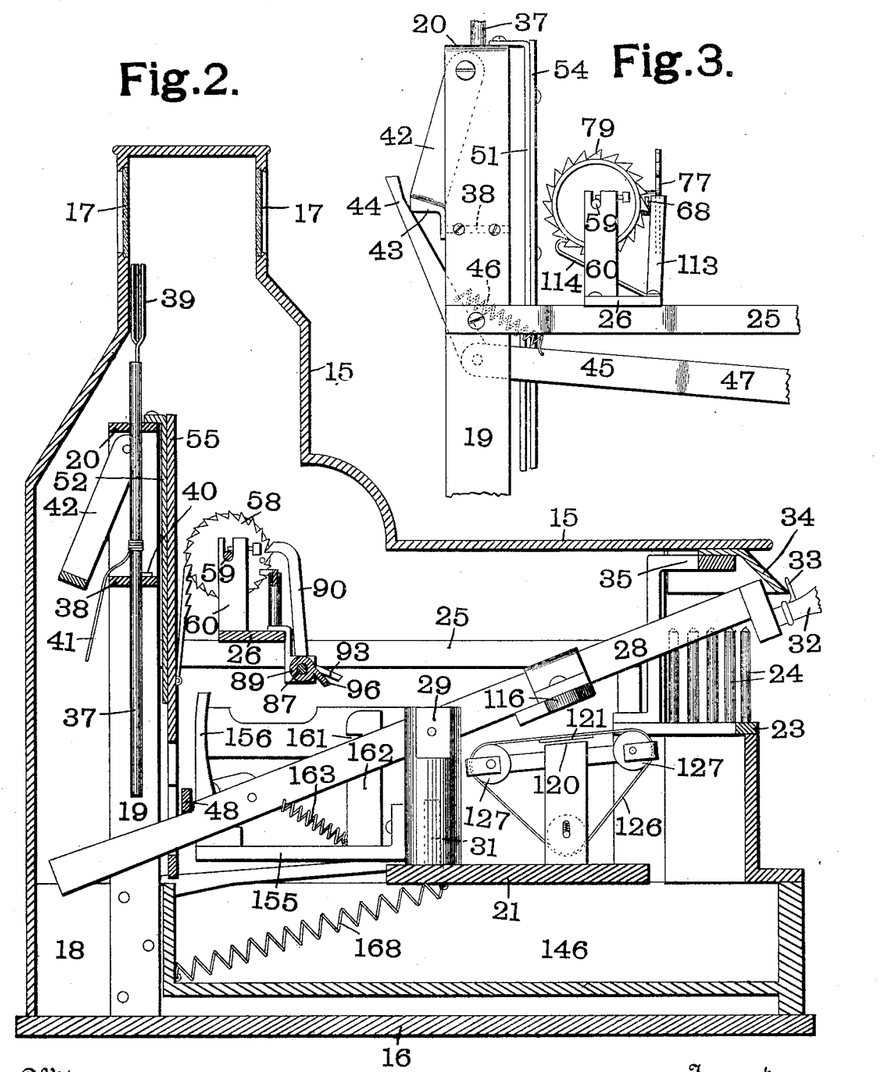
Fig. 2 is a section on the line 2 2 of Fig. 1, the main or operating lever being shown in a different position.
Fig. 3 is an enlarged detail view showing one end of the adding mechanism and some of the surrounding parts.

Pending from the cross-plate 26 is a shaft 87, Fig. 2, upon which are mounted three sleeves 88, 89, and 91, respectively. The sleeve 88 is provided with a pawl 90, which engages with the ratchet-wheel 58. The sleeve 88 is provided with a spring 92, which normally holds it in such direction as to hold the pawl 90 in engagement with the wheel 58. The sleeve 88 is also provided with a forwardly-projecting member 93, adapted to be struck by the operating-lever 28 to throw the pawl 90 firmly in engagement with the wheel 58. The sleeve 89 is provided with a pawl 94, adapted to engage with the ratchet-wheel 69. The sleeve is also provided with a spring 95, arranged so as to hold the pawl 94 normally out of contact with the ratchet-wheel 69.

96 is a member projecting forwardly from the sleeve 89 and adapted to be struck by the operating-lever 28 to throw the pawl 94 in engagement with the ratchet-wheel 69.

The sleeve 91 is provided with a pawl 97, adapted to engage with the ratchet-wheel 74. A spring 98 holds the pawl normally in engagement with said ratchet-wheel. The sleeve 91 is provided with a forwardly-projecting member 99, adapted to be struck by the operating-lever 28.

Figures 4, 5, 6:
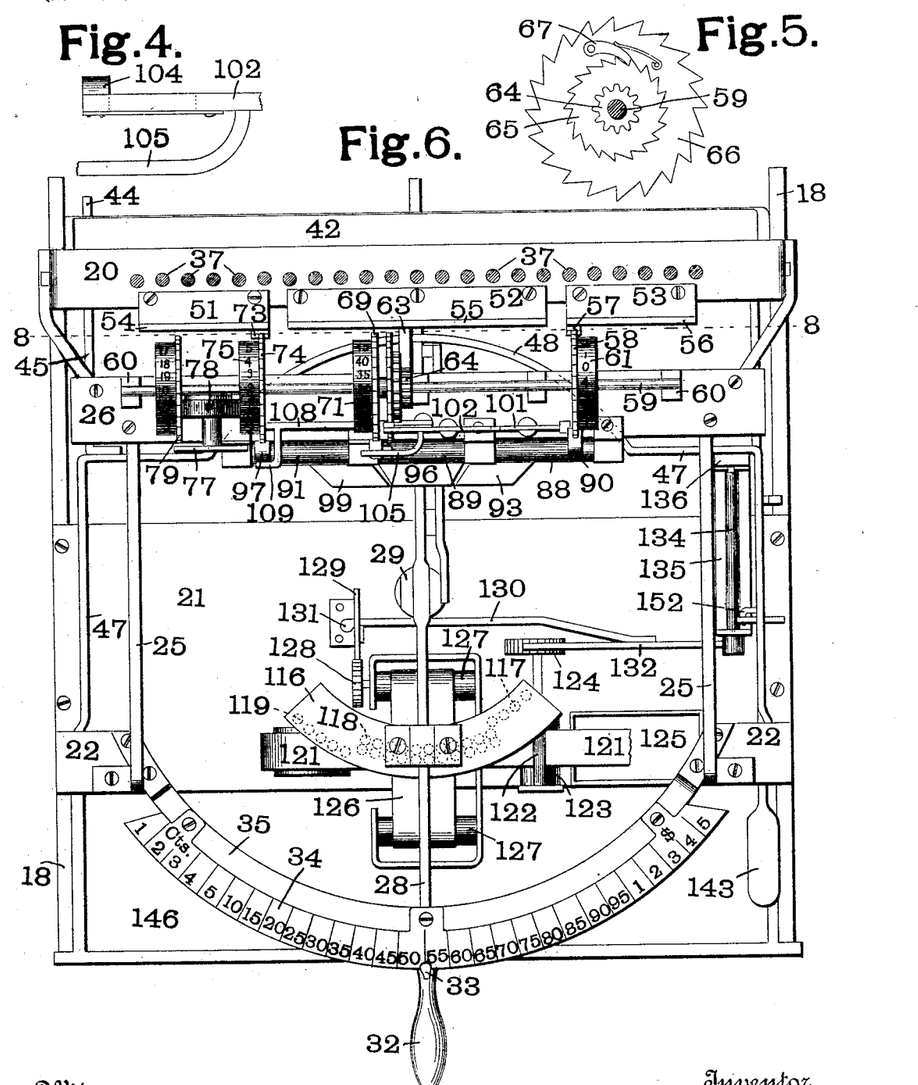
Figs. 4 and 5 are enlarged detail views of portions of the adding mechanism.
Fig. 6 is a top plan view of the complete machine, the casing being removed.

Pivoted in an upright 100 is a lever 101, one end of which is in the path of the pins 62 on the ratchet-wheel 58. The other end of the lever 101 has resting upon it the end of a lever 102, which is pivoted in an upright 103. The opposite end of the lever 102 is provided with a spring-detent 104, Fig. 4, adapted to engage with the ratchet-wheel 66. This end of the lever is also provided with an arm 105, adapted to strike the pawl 94 and throw the same into engagement with the ratchet-wheel 69. Pivoted in an upright 107 is a lever 108, the end of which is arranged with a spring-detent in the same manner as the lever 105, which spring-detent is adapted to engage with the ratchet-wheel 74. The end of the said lever 108 is also provided with an arm 109, adapted to strike the pawl 97 to throw the same firmly into engagement with the ratchet-wheel 74. The end of the lever 102 is normally held down by means of a spring 110, and the end of the lever 108 is normally held up by means of a spring 111.

112 is a spring-detent which holds the ratchet-wheel 77 against rotation until it is forced outwardly by contact with the pin 76, when the said wheel 77 may be turned by the said pin. The wheel 77 is prevented from rotating backward by means of a spring-detent 113. The ratchet-wheel 79 is provided with a spring-detent 114.

The lever 28 is provided with a type-carrying frame 116, on the under face of which are placed type corresponding to the figures on the indicators 39 and the segment 34. These type are arranged in groups corresponding to the plates 51, 52, and 53. The group 117 at the right-hand end of the type-carrying frame 116 corresponds to indicators actuated by the plate 56 and print from one to four cents. The group 118 at the center of the type-carrying frame corresponds to the indicators actuated by the plate 55 and print from five to ninety-five cents by fives, and the group 119 at the left-hand end of the type-carrying frame corresponds to the indicators actuated by the plate 54 and print from one to five dollars. The type in the frame 116 coöperate with a platen 120, Fig. 2, to print the various sums on a strip of paper 121, passing over said platen. The strip of paper 121 passes between two rollers 122 and 123, Fig. 6. The lower roller 123 is provided with a ratchet-wheel 124, through which it is operated to feed the paper, as hereinafter described. The strip of paper 121 after the sums are printed thereon passes into a receptacle 125.

Figure 9:
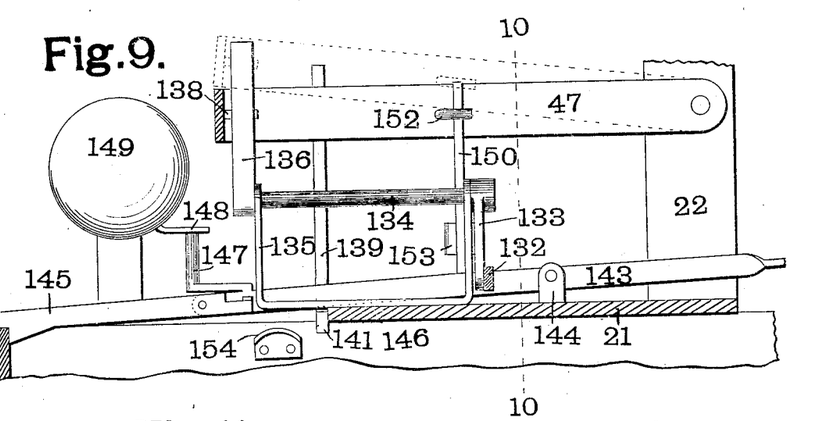
Fig. 9 is a view of the mechanism for controlling the cash-drawer.
Figure 10:
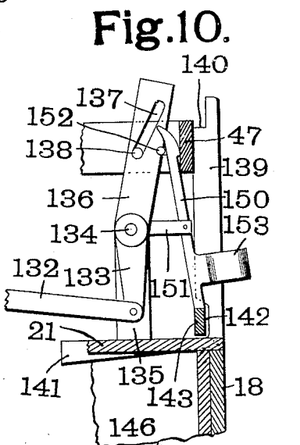
Fig. 10 is a view on the line 10 10 of Fig. 9.
Figure 11:
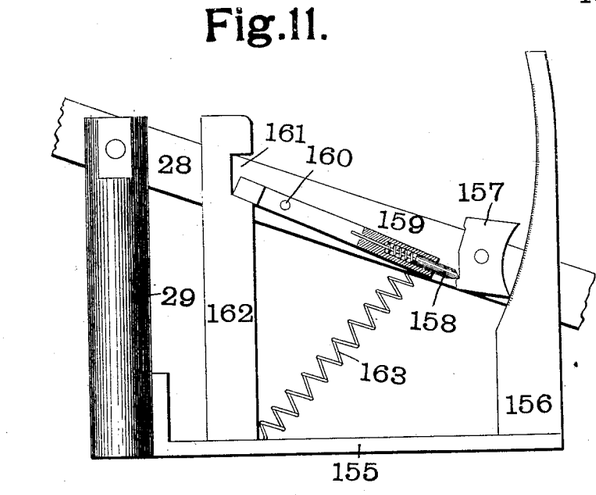
Fig. 11 is a view showing the mechanism for controlling the movement of the main lever.

126 is an inking-ribbon which passes between the strip of paper 121 and the printing-frame 116. The ribbon 126 passes around rollers 127, one of which is provided with a ratchet-wheel 128, by means of which the ribbon is fed forward. The ratchet-wheel 128 is engaged by a pawl 129, which is actuated by an arm 130, provided with a cam-shaped end 131. The arm 130 is secured to a pawl 132, which engages with the ratchet-wheel 124. The end of the pawl 132 is rigidly secured to an arm 133, Figs. 9 and 10, carried by a rock-shaft 134. The rock-shaft 134 is supported in a frame 135. The opposite end of the rock-shaft 134 has rigidly secured to it an upwardly-extending arm 136, in which is formed a slot 137, which engages with a pin 138, carried on the U-shaped frame 47.

139 is a detent provided at its upper end with a notch 140, adapted to engage with one arm of the U-shaped frame 47 when the same is raised and hold the same in the raised position until it is operated to release the said frame. The detent 139 is provided with an arm 141, which acts as a weight to throw it under the said frame 47. The lower end of the detent 139 is provided with a notch 142, having its upper edge inclined. Through this notch 142 passes a lever 143, pivoted in lugs 144. The end of the lever 143 is provided with a pivoted part 145, adapted to engage with the rear end of the cash-drawer 146 and prevent the said drawer from being opened until the front end of the lever 143 is depressed. The lever 143 is also provided near its rear end with an upwardly-projecting pin 147, which engages with a lever 148 for ringing a bell 149.

150 is a detent which is pivoted to a lug 151, projecting laterally from the frame 135. The upper end of the detent 150 passes between the frame 47 and an L-shaped pin 152, carried by said frame. The lower end of the detent 150 rests on the lever 143 when the frame 47 is in its lowest position, and thus prevents the lever from moving. The detent 150 is also provided with a weight 153, which causes the said detent to swing out of engagement with the lever 143 when the frame 47 is in its raised position.

Projecting rearwardly from the stud 29 is an arm 155, carrying on its end a curved rack 156. On the lever 28 is a double-ended dog 157, which engages with the teeth of the curved rack 156. The ends of the dog 157 are alternately held in engagement with the teeth of the rack 156 by means of a pin 158, yieldingly mounted in an arm 159, pivoted to the lever 28 at the point 160. The opposite end of the arm 159 engages with a notch 161 in an upright 162, carried by the arm 155. As the end of the arm 159 comes in contact with one or the other of the ends of the notch 161 the pin 158 is thrown from one side to the other of the dog 157, thus reversing the said dog and causing one or the other end to come in contact with the teeth of the rack 156. The end of the lever 28 is normally held down by means of a spring 163, extending from the said lever 28 to the arm 155.

In order to insure the plates 54, 55, and 56 returning to their normal position after being raised by the lever 28, I provide the said plates 54 and 56 with L-shaped arms 165 and 166, respectively, which extend beneath the said lever 28, and I provide the plate 55 with a U-shaped frame 167, which also extends beneath the said lever 28, as shown in Fig. 8.

In order to open the cash-drawer 146 automatically when the detent 145 is released, I secure to the rear end of the said drawer 146 one end of a spring 168, Fig. 2, the opposite end of which is attached to the cross-plate 21.

Figure 1:
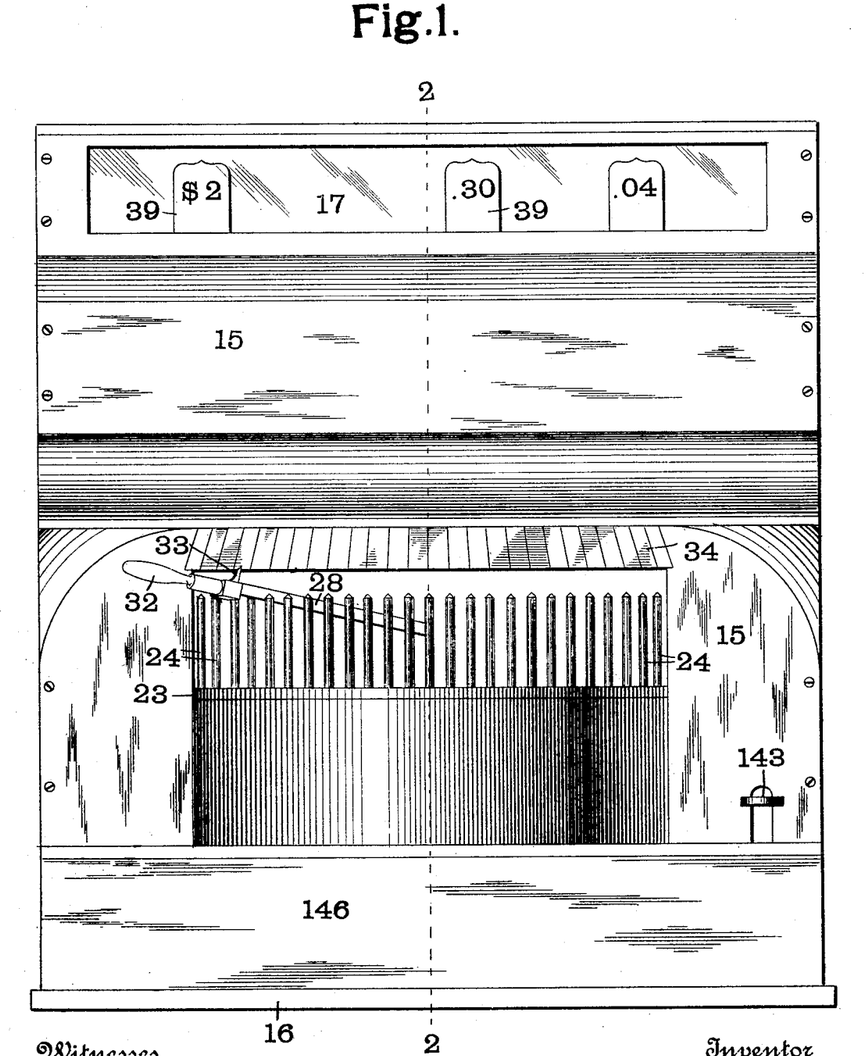
Figure 1 is a front elevation of the register and inclosing casing.

The operation of my register is as follows: Suppose it is desired to register in the machine a sale amounting to two dollars and thirty-four cents. The lever 28 is first moved by means of the handle 32 over the numeral "2" at the right-hand end of the segment 34. The lever is then depressed between the rods 24. When the lever is depressed, the type "2" in the group 119 is brought against the inking-ribbon and caused to print the amount of two dollars on the strip 121. At the same time the opposite end of the lever 28 is elevated, coming in contact with the lower end of the rod 37, carrying the tab 39, bearing the amount of two dollars. At the same time the sliding plate 54 is raised sufficiently to move the ratchet-wheel 74 two notches by means of the pawl 73. This causes the figure "2" to be displayed by the drum 75. At the same time the U-shaped frame 47 is raised on account of its curved part 48 resting on the lever 28. As soon as the frame 47 is raised to its highest position the notch 140 of the detent 139 engages with the said frame and detains it in its raised position. This movement of the frame also forces the detent 150 out of engagement with the lever 143, so that the same may be operated. This movement also rocks the shaft 134, because of the movement of the pin 138 in the slot 137 of the arm 136. The motion of the shaft 134 is communicated from the arm 133 to the pawl 132, which moves the wheel 124 forward one notch. This also moves the arm 130, so as to cause the pawl 129 to feed the wheel 128 forward one notch. The action of the dog 157 on the teeth of the rack 156 is such that the lever 28 cannot be returned to its raised position until it has completed its stroke, when the end of the arm 159 comes in contact with the end of the notch 161 and causes the said dog to reverse, and the lever 28 can now be returned and cannot be pushed down again until raised to its normal position, where the dog 157 is again reversed. The said lever 28 is now moved to the numeral "30" on the segment 34 and again depressed. The result of this depression is to print the number "30" on the slip 121 and at the same time to raise the rod 39, carrying the tab bearing the number "30." It also lifts the plate 55, and by means of the rack 63 moves the wheels 66 and 69 forward six notches. The handle 32 is now returned to its normal position and moved until the indicator 33 points to the figure "4" at the left-hand end of the segment 34, indicating four cents. The lever is now again depressed for printing the amount of four cents on the slip 121 and at the same time raising the tab bearing the figure "4" and also raising the sliding plate 56, and thus moving the ratchet-wheel 61 forward four notches. The indicator-tabs 39 will now display the amount of two dollars and thirty-four cents, as shown in Fig. 1, and the adding mechanism will register the same amount on the drums 75, 71, and 61. The lever 143 is now depressed. This raises the detent 145 out of engagement with the rear end of the cash-drawer 146 and allows the spring 168 to throw the drawer open. At the same time the raising of the rear end of the lever 143 throws the detent 139 from under the frame 47 and allows the said frame to drop into its normal position. This moves the arm 136, which through the connection hereinbefore described allows the pawls 129 and 132 to move backward on the wheels 128 and 124 in position to again feed the paper and inking-ribbon when the frame 47 is again raised. The movement of the lever 143 is communicated through the pin 147 to the lever 148, causing the bell 149 to ring. As soon as the lever 143 is released the detent 150 again engages with it and prevents its being again depressed until the operating-lever 28 of the machine is again actuated to raise the frame 47. In case a sum is rung up while the drawer 146 is open the frame 47 will be raised and retained in its raised position by the detent 139; but when the drawer is closed the curved block 154, carried by the drawer, will strike against the arm 141, and thus actuate the detent to release the frame. When the rods 37 are raised by the lever 28, they are held in their raised position by means of the spring-detent 38, which comes in contact with the U-shaped frame 42. This holds the tabs 29 in view through the glazed openings 17 until another sale is made. As soon as the lever 28 is depressed to record another sale the arm 44 engages with the L-shaped piece 43 on the frame 42 and moves the said frame sufficiently to allow all the rods 37 which have been previously elevated to fall in their normal position.

In the operation of the adding mechanism when the ratchet-wheel 58 is moved five notches one of the pins 62 comes in contact with the end of the lever 101, thus depressing the end of said lever. This raises the end of the lever 102, causing the ratchet-wheel 66 to move forward one notch, thus transferring five into the wheel 69. At the same time the arm 105 throws the pawl 94 into engagement with the wheel 69 and prevents it being moved more than one notch. As soon as the wheels 69 and 66 have been moved through one revolution the pin 72 comes in contact with the lever 108, thus depressing said lever and moving the wheel 74 forward one notch, thus transferring the amount of one dollar to the wheel 74. At the same time the arm 109 strikes the pawl 97 and holds it in engagement with the wheel 74, thus preventing said wheel from moving forward more than one notch. When the wheel 74 has been moved forward ten notches, the pin 76 forces the detent 112 out of engagement with the wheel 77 and moves said wheel forward one notch, thus transferring the sum of ten dollars to said wheel 77. Each revolution of the wheel 77 causes the pin 78 to engage with the wheel 79 and move it forward one notch, thus transferring the sum of one hundred dollars to said wheel 79. The pawls 91, 94, and 97 are also actuated by the the lever 28 striking against the forwardly-projecting parts 93, 96, and 99, thus preventing overrotation of the wheels 58, 69, and 74 when actuated by the movement of the handle 28.

I am aware that many changes may be made in the form and construction of my register without departing from the spirit of my invention, and I do not wish to limit myself to the construction shown and described except where so stated in the claims.

Having fully described my invention, what I claim as new, and desire to secure by Letters Patent of the United States, is—

1. In a cash-register, the combination with an indicating device, of a lever for actuating said indicating device, a sliding member provided with notches of varying length coöperating with said lever, adding mechanism actuated by said sliding member, and an arm carried by said sliding member and adapted to engage with said lever to return said sliding member to its normal position.

2. In a cash-register, the combination with indicating devices, of a lever actuating said indicating devices, a sliding member provided with notches varying in length and coöperating with said lever, adding mechanism, and a toothed member carried by said sliding member and engaging with said adding mechanism.

3. In a cash-register, the combination with indicating devices, of a lever actuating said indicating devices, a sliding member provided with notches of varying length coöperating with said lever, adding mechanism, and a toothed member pivotally mounted on said sliding member and engaging with said adding mechanism.

4. In a cash-register or the like, the combination with a plurality of adding-wheels, of a pivoted lever adapted to actuate said adding-wheels, a pawl engaging with one of said adding-wheels, carrying mechanism for transferring the amount to be carried, and means operated by said transferring mechanism for actuating said pawl.

5. In a cash-register or the like, the combination with adding mechanism, of a plurality of adding-wheels, a pivoted lever actuating said adding-wheels, a pawl for one of said adding-wheels, carrying mechanism for transferring from one of said adding-wheels to another, means operated by said carrying mechanism for actuating said pawl, and connections for actuating said pawl by the movement of said lever.

6. In a cash-register, the combination with a plurality of indicators arranged in groups, of a pivoted lever adapted to move in one direction to determine the indicator to be displayed and in another direction to operate and display said indicator, and a printing device carried by said lever and provided with characters arranged in groups corresponding to said groups of indicators.

7. In a cash-register, the combination with adding mechanism, of a plurality of movable members adapted to actuate said adding mechanism, a pivoted lever movable in one direction to determine the amount to be added and in another direction to operate one of said movable members, and a printing device carried by said lever and provided with groups of characters corresponding to the movable members.

8. In a cash-register, the combination with a plurality of indicators arranged in groups, of an adding mechanism, a plurality of movable members adapted to actuate said adding mechanism, a pivoted lever movable in one direction to determine the indicator to be displayed and the amount to be added and in another direction to display said indicator and operate one of said movable members, and a printing device carried by said lever and provided with groups of characters corresponding to the indicators and movable members.

9. In a cash-register, the combination with a plurality of indicators, of operating means for actuating said indicators, a cash-drawer, a lever for releasing said cash-drawer, locking mechanism for said lever, and connections actuated by said operating means for releasing said locking mechanism.

10. In a cash-register, the combination with a plurality of indicators, of a lever movable in one direction to determine the indicator to be displayed and in another direction to operate and display said indicator, a cash-drawer, a lever for releasing said cash-drawer, locking devices for said latter-named lever, and connections actuated by said first-named lever for releasing said locking devices.

11. In a cash-register, the combination with a plurality of indicators, of a movable member adapted to actuate any desired indicator, a movable frame actuated by said movable member, a detent for locking said movable frame, means for releasing said detent, a printing device including paper-feeding mechanism, and connections for actuating said paper-feeding mechanism through the movement of said frame.

12. In a cash-register, the combination with a plurality of indicators, of a movable member adapted to actuate any desired indicator, a movable frame actuated by said movable member, a detent for locking said movable frame, means for releasing said detent, a printing device including an inking-ribbon, and connections for feeding said inking-ribbon through the movement of said frame.

13. In a cash-register, the combination with a plurality of indicators, of a movable member adapted to actuate any desired indicator, a movable frame actuated by said movable member, a detent for locking said movable frame, means for releasing said detent, a printing device including paper-feeding mechanism and inking-ribbon, and connections for actuating said paper-feeding mechanism and inking-ribbon through the movement of said frame.

14. In a cash-register, the combination with an indicating device, of operating means for actuating said indicating device, a cash-drawer, a lever for releasing said cash-drawer, locking mechanism for said lever, and means carried by said drawer for releasing said locking mechanism.

15. In a cash-register, the combination with an indicating device, of operating means for actuating said indicating device, a cash-drawer, a lever for releasing said cash-drawer, locking mechanism for said lever, connections actuated by said operating means for releasing said locking mechanism, and means carried by said cash-drawer for releasing said locking mechanism.

In testimony whereof I have hereunto set my hand and affixed my seal in the presence of the two subscribing witnesses.

OSCAR W. HUNSAKER. [L. S.]

Witnesses:
JAMES H. BRYSON,
W. A. ALEXANDER.